(12) United States Patent
Honbo

(10) Patent No.: US 9,732,787 B2
(45) Date of Patent: Aug. 15, 2017

(54) TWO-DIMENSIONAL MOVEMENT CLOSED-LINK STRUCTURE

(71) Applicant: KOMATSU NTC LTD., Nanto, Toyama (JP)

(72) Inventor: Satoshi Honbo, Toyama (JP)

(73) Assignee: Komatsu NTC Ltd., Nanto (JP)

( * ) Notice: Subject to any disclaimer, the term of this patent is extended or adjusted under 35 U.S.C. 154(b) by 0 days.

(21) Appl. No.: 14/769,513

(22) PCT Filed: Feb. 25, 2014

(86) PCT No.: PCT/JP2014/054511
§ 371 (c)(1),
(2) Date: Aug. 21, 2015

(87) PCT Pub. No.: WO2014/132960
PCT Pub. Date: Sep. 4, 2014

(65) Prior Publication Data
US 2016/0003291 A1 Jan. 7, 2016

(30) Foreign Application Priority Data

Mar. 1, 2013 (JP) .................................. 2013-040845

(51) Int. Cl.
*F16C 11/04* (2006.01)
*F16H 21/10* (2006.01)
(Continued)

(52) U.S. Cl.
CPC .............. *F16C 11/04* (2013.01); *B25J 9/106* (2013.01); *F16H 21/10* (2013.01); *F16M 13/02* (2013.01)

(58) Field of Classification Search
CPC . B25J 11/00; B25J 9/106; F16C 11/04; F16H 21/10; F16M 13/02
(Continued)

(56) References Cited

U.S. PATENT DOCUMENTS 4,712,971 A * 12/1987 Fyler .................... B25J 9/104
414/744.1
4,756,662 A * 7/1988 Tanie .................... B25J 9/06
414/729
(Continued)

FOREIGN PATENT DOCUMENTS

CN 1589191 A 3/2005
CN 1903520 A 1/2007
(Continued)

OTHER PUBLICATIONS

International Search Report (PCT/ISA/210) dated Jun. 3, 2014, with English translation (Five (5) pages).
(Continued)

*Primary Examiner* — Nkeisha Smith
(74) *Attorney, Agent, or Firm* — Crowell & Moring LLP

(57) ABSTRACT

Provided is a two-dimensional movement closed-link structure for supporting a moving object. The moving object can freely move in a plane includes a fixed link, a first link one end of which is rotatably connected to one end of the fixed link, a second link one end of which is rotatably connected to the other end of the first link, a third link one end of which is rotatably connected to the other end of the second link, and a fourth link one end of which is rotatably connected to the other end of the third link and the other end of which is rotatably connected to the other end of the fixed link, the second link having joint parts at both ends at which the second link is connected and a bar part, and the moving object being disposed in the bar part of the second link.

2 Claims, 9 Drawing Sheets

(51) Int. Cl.
*B25J 9/10* (2006.01)
*F16M 13/02* (2006.01)

(58) Field of Classification Search
USPC .......... 74/479, 522, 586; 248/277.1; 901/15; 414/917, 744.5
See application file for complete search history.

(56) References Cited

U.S. PATENT DOCUMENTS

| | | | | |
|---|---|---|---|---|
| 4,762,016 | A * | 8/1988 | Stoughton | B25J 9/04 414/680 |
| 5,107,719 | A * | 4/1992 | Kota | B25J 9/106 414/744.5 |
| 5,522,275 | A * | 6/1996 | Mauletti | B21D 43/105 414/744.5 |
| 5,673,595 | A * | 10/1997 | Hui | B25J 9/106 414/680 |
| 6,116,844 | A * | 9/2000 | Hayward | B25J 9/106 414/680 |
| 6,336,374 | B1 * | 1/2002 | Brogardh | B25J 9/1065 74/490.03 |
| 6,648,289 | B2 * | 11/2003 | Toennesland | A61B 8/00 248/131 |
| 7,023,423 | B2 * | 4/2006 | Rosenberg | A63F 13/06 345/156 |
| 7,090,458 | B2 * | 8/2006 | Huang | B25J 9/1065 414/735 |
| 7,249,951 | B2 * | 7/2007 | Bevirt | G05G 9/04 345/156 |
| 7,568,879 | B2 * | 8/2009 | Baccini | B25J 9/106 414/729 |
| 8,419,338 | B2 * | 4/2013 | Konosu | B25J 5/02 212/292 |
| 2005/0092121 | A1 * | 5/2005 | Huang | B25J 9/1065 74/490.01 |

FOREIGN PATENT DOCUMENTS

| | | |
|---|---|---|
| CN | 1903521 A | 1/2007 |
| JP | 60-48276 A | 3/1985 |
| JP | 5-318345 A | 12/1993 |
| JP | 8-243136 A | 9/1996 |
| JP | 10-193287 A | 7/1998 |
| JP | 2002-154792 A | 5/2002 |
| JP | 2004-207648 A | 7/2004 |

OTHER PUBLICATIONS

Japanese language Written Opinion (PCT/ISA/210) dated Jun. 3, 2014 (Three (3) pages).
Chinese Office Action issued in counterpart Chinese Application No. 201480011108.9 dated May 19, 2016 (six (6) pages).

\* cited by examiner

TWO-DIMENSIONAL MOVEMENT CLOSED-LINK STRUCTURE

TECHNICAL FIELD

The present invention relates to a two-dimensional movement closed-link structure, in particular, relates to a two-dimensional movement closed-link structure for freely movably supporting a moving object in a plane.

BACKGROUND ART

Conventionally, there have been known various link devices applied to a robotic device used for assembly work, transport operation or the like (for example, Patent Documents 1 and 2). These link devices are generally set such that a movable range and applied load characteristics meet the work contents and purpose. A link structure described in Patent Document 1 is a closed-link structure composed of four links from a first link to a fourth link, the first link and the fourth link being rotatably connected to a base, and supports a hand (moving object) on the same axis as a connection axis of a second link with a third link.

A link structure described in Patent Document 2 is a closed-link structure composed of four links from a second link to a fifth link, the second link and a third link being rotatably connected to a fixed first link, and another end of a fourth link and another end of the fifth link can be connected to each other, so that a light work is carried out in a non-connected state, and an applied load greater than the light work can be received in a connected state.

CITATION LIST

Patent Literature

{Patent Document 1}
Japanese Patent Application Publication No. H10-193287 (Claim 1, FIG. 1)
{Patent Document 2}
Japanese Patent Application Publication No. S60-048276 (Object of Invention, Claim 1, FIG. 1)

SUMMARY OF INVENTION

Technical Problem

However, in the link structures described in Patent Document 1 and Patent Document 2, since the moving object is supported by a joint portion of links, an excessive load is applied to the joint portion supporting the moving object, to be lack of support rigidity. Although the link structures are suitable for light load work, there has been a problem that it is difficult to ensure a wider movable range while improving movement accuracy by improving support rigidity for the moving object, in particular, in heavy load work.

The present invention has been made in view of such a background, and an object of the present invention is to provide a two-dimensional movement closed-link structure capable of ensuring support rigidity for the moving object, improving movement accuracy, and ensuring a wide movable range.

Solution to Problem

In order to solve the above problems, an invention according to claim 1 is a two-dimensional movement closed-link structure for freely movably supporting a moving object in a plane, comprising: a fixed link; a first link, one end of which is rotatably connected to one end of the fixed link; a second link, one end of which is rotatably connected to the other end of the first link; a third link, one end of which is rotatably connected to the other end of the second link; and a fourth link, one end of which is rotatably connected to the other end of the third link and the other end of which is rotatably connected to the other end of the fixed link, wherein the second link includes joint portions at both ends at which the second link is connected, and a bar portion for integrally combining the joint portions at the both ends, and wherein the moving object is disposed in the bar portion of the second link.

According to this invention, since the moving object is disposed in the bar portion of the second link, the moving object is supported across the joint portions of the one end of the second link and the other end thereof. Therefore, it is possible to improve support rigidity, as compared with a case where the moving object is supported by the joint portions in one position where the other end of the second link and the one end of the third link are connected to each other.

In this manner, the present invention can provide a two-dimensional movement closed-link structure capable of ensuring a wider movable range while improving movement accuracy by improving support rigidity for the moving object by a simple link structure, and capable of being further suitably applied to unprecedented new uses.

An invention according to claim 2 is the two-dimensional movement closed-link structure described in claim 1, and is characterized in that the moving object is disposed shifted by a predetermined shift amount toward an outside of a closed link from a line connecting the one end of the second link and the other end thereof.

With this configuration, by shifting the moving object toward the outside of the closed link in the second link, it is possible to suppress interference between the moving object and the other links, thereby ensuring a wider movable range of the moving object.

An invention according to claim 3 is the two-dimensional movement closed-link structure described in claim 2, and is characterized in that a length of the first link is equal to a length of the fourth link, wherein the second link is provided with a bent portion bent in a dogleg shape toward the outside of the closed link, and a length from the bent portion to the one end of the second link is equal to a length of the third link, and wherein the moving object is disposed between the bent portion and the other end of the second link.

With this configuration, it is possible to form a compact closed-link structure while ensuring a wider movable range of the moving object.

Further, an invention according to claim 4 is the two-dimensional movement closed-link structure described in any one of claims 1 to 3, further comprising a base member in which the fixed link is disposed, wherein the base member has a shape in which at least two directions out of a left-right direction, a front-rear direction, and an up-down direction are defined, and the two directions of the base member are set in directions respectively along an X-axis and a Y-axis, which define the plane and are perpendicular to each other, while a crossing angle of the Y-axis and a line connecting the one end of the fixed link and the other end thereof is set to be closer to a right angle than a crossing angle of the X-axis and the line connecting the one end of the fixed link and the other end thereof, and wherein the other end of the fixed link is disposed closer to the moving object than the one end of the fixed link in the Y-axis direction.

With this configuration, it is possible to ensure a wider movable range of the moving object more evenly on both sides of a line which passes through a center of the fixed link and is parallel to the Y-axis.

Advantageous Effects of Invention

According to the present invention, it is possible to provide a two-dimensional movement closed-link structure capable of ensuring support rigidity for the moving object, improving movement accuracy, and ensuring a wide movable range.

DESCRIPTION OF EMBODIMENTS

Figure 1:
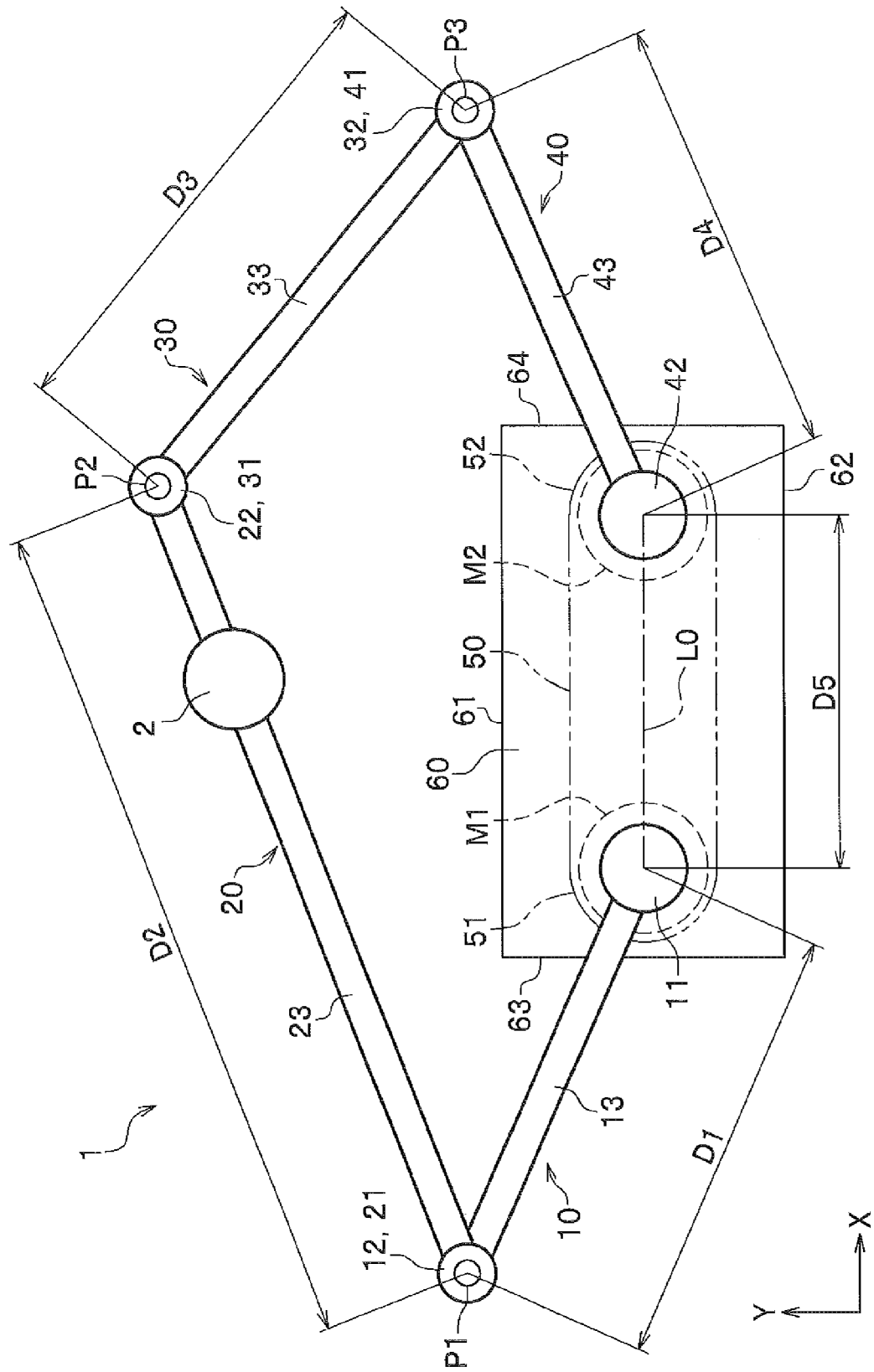
FIG. 1 is a front view schematically showing an overall configuration of a link structure according to a first embodiment of the present invention.

Embodiments of the present invention will be described in detail with reference to the drawings. Note that, in the drawings described below, the same members or the corresponding members are denoted by the same reference numerals. Further, the size and shape of members may be schematically shown with deformation or exaggeration, for convenience of description.

<First Embodiment>

First, with reference to FIG. 1, a two-dimensional movement closed-link structure (hereinafter, also referred to as simply a "link structure") 1 according to a first embodiment of the present invention will be described.

FIG. 1 is a front view schematically showing an overall configuration of the link structure 1 according to the first embodiment of the present invention. As shown in FIG. 1, the link structure 1 is a two-dimensional movement closed-link structure for freely movably supporting a moving object 2 in an XY plane defined by an X-axis and a Y-axis, which are perpendicular to each other.

The moving object 2 is an object which is moved by the link structure 1, and is not particularly limited, however, can assume, for example, a work table, a spindle device of a machining center, or a hand device for holding a conveying object (a product, a work or the like) in a conveying means.

The link structure 1 includes a fixed link 50, a first link 10 one end of which is rotatably connected to one end of the fixed link 50, a second link 20 one end of which is rotatably connected to the other end of the first link 10, a third link 30 one end of which is rotatably connected to the other end of the second link 20, and a fourth link 40 one end of which is rotatably connected to the other end of the third link 30 and the other end of which is rotatably connected to the other end of the fixed link 50.

Here, an element constituting the link structure 1 is referred to as a link. Further, in each link, both end portions at which other links are connected are referred to as joint portions, and a portion for integrally combining the both end portions of the link is referred to as a bar portion. Further, a link in which the joint portions at both ends thereof are not moved (except when the entire link structure is moved) is referred to as a fixed link, and a link in which at least one of the joint portions at both ends thereof is moved, is referred to as a movable link.

Figure 2A:
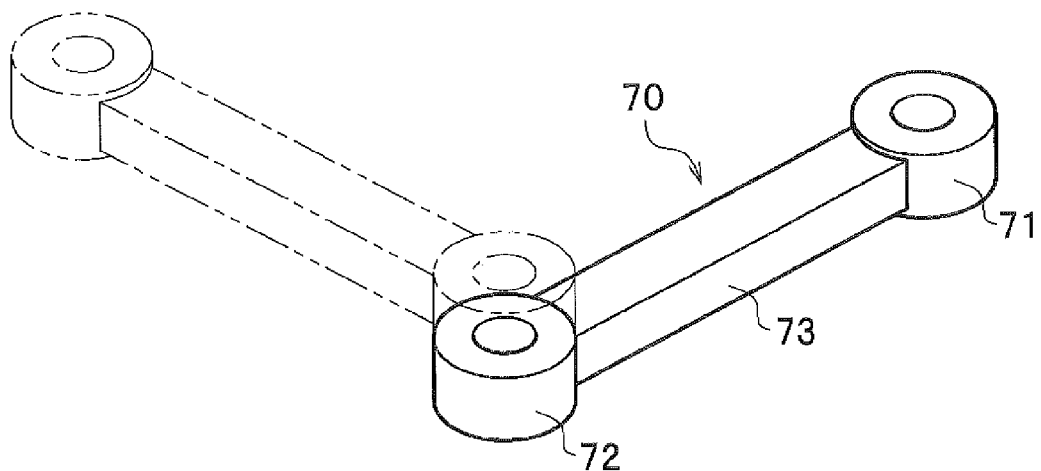
FIG. 2A is a perspective view showing an example of a link.
Figure 2B:
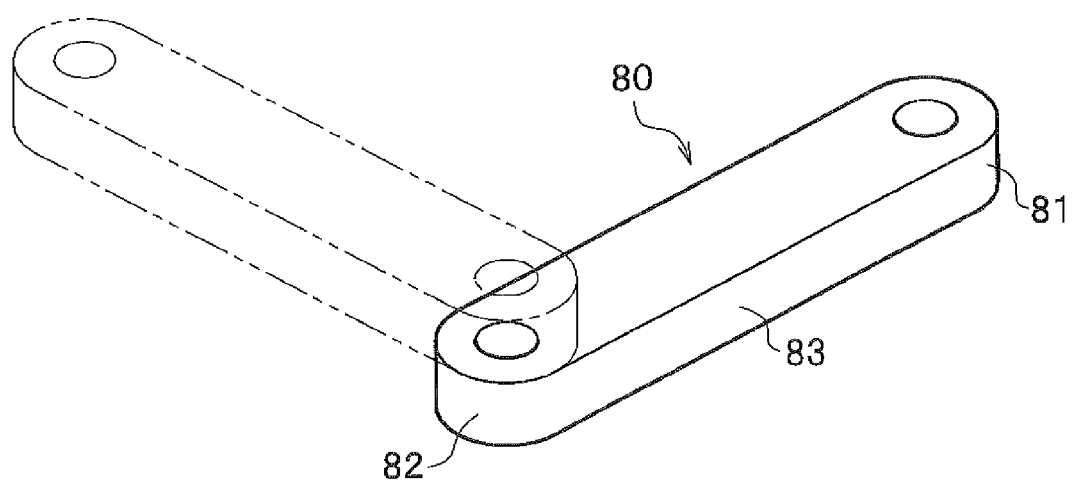
FIG. 2B is a perspective view showing another example of the link.

FIG. 2A is a perspective view showing an example of a link, and FIG. 2B is a perspective view showing another example of the link. In the example shown in FIG. 2A, a link 70 includes joint portions 71, 72 at both ends at which the link 70 is connected, and a bar portion 73 for integrally combining the joint portions 71, 72 at both ends thereof. Further, in the example shown in FIG. 2B, a link 80 includes joint portions 81, 82 at both ends at which the link 80 is connected, and a bar portion 83 for integrally combining the joint portions 81, 82 at both ends thereof. In the link 80, the joint portions 81, 82 are assumed to be virtually cylindrical portions including outer surfaces of end portions in the longitudinal direction of the link 80 as parts of outer peripheral surfaces thereof.

Here, each link constituting the link structure 1 shown in FIG. 1 is formed in the same shape as the link 70 or 80 shown in FIG. 2A or 2B. However, the shape of each link used in the link structure 1 is not particularly limited to the shapes shown in FIGS. 2A and 2B.

Returning to FIG. 1, the link structure 1 includes a base member 60 in which the fixed link 50 is disposed. In other words, the link structure 1 forms a closed-link structure including the first link 10, the second link 20, the third link 30, the fourth link 40, which are movable links, and the fixed link 50 disposed in the base member 60. Note that, the fixed link 50 may be configured to be provided in the base member 60 as a separate body from the base member 60, or a portion of the base member 60 may be configured to function as the fixed link 50.

The base member 60 has a shape in which at least two directions out of the left-right direction, the front-rear direction, and the up-down direction (in an example in FIG. 1, the left-right direction and the up-down direction) are defined. In other words, here, the base member 60 has an upper surface 61 and a lower surface 62 in the left-right direction, and a left side surface 63 and a right side surface 64 in the up-down direction. Then, the left-right direction and up-down direction of the base member 60 are respectively set in directions along (directions in parallel with) the X-axis and the Y-axis. In other words, the upper surface 61 and lower surface 62 of the base member 60 are set in the X-axis direction, and the left side surface 63 and right side surface 64 of the base member 60 are set in the Y-axis direction.

The XY plane which is a movement plane of the moving object 2 is intended that the direction of the plane is not particularly limited, and can be appropriately set according to the purpose and application. In other words, here, the XY plane is assumed to be a plane in the vertical direction, however, it is not limited to this, and it may be a plane in the horizontal direction, and further it may be a plane which is set shifted by a predetermined angle from the horizontal direction or the vertical direction. For example, when using the link structure 1 as the conveying means for a conveying device, the X-axis direction can be a conveying direction. Further, when using the link structure 1 as the conveying means for a spindle device of a machine tool, the X-axis direction can be the left-right direction, and the Y-axis direction can be the front-rear direction or the up-down direction.

The fixed link 50 has a joint portion 51 provided at one end thereof and a joint portion 52 provided at the other end thereof. The joint portion 51 and the joint portion 52 are the fixed portions located at both ends of the fixed link 50, and are respectively connected to the first link 10 and the fourth link 40.

In the present embodiment, a line L0 connecting the one end of the fixed link 50 and the other end thereof, is set to be perpendicular to the Y-axis.

The first link 10 includes a joint portion 11 provided at one end thereof, a joint portion 12 provided at the other end thereof, and a bar portion 13 for integrally combining the joint portions 11, 12 at both ends thereof. The joint portion 11 of the first link 10 is connected to the joint portion 51 of the fixed link 50 so as to be rotatable around a central axis of the joint portion 51.

To the joint portion 11 of the first link 10, an output shaft (not shown) of a rotary drive device M1, for example such as a servo motor is connected, so that a rotational force can be transmitted. Therefore, by operation of the rotary drive device M1, it is possible to rotate the first link 10 to a predetermined rotational direction angular position around the joint portion 11.

The second link 20 includes a joint portion 21 provided at one end thereof, a joint portion 22 provided at the other end thereof, and a bar portion 23 for integrally combining the joint portions 21, 22 at both ends thereof. The joint portion 21 of the second link 20 is connected to the joint portion 12 of the first link 10 so as to be rotatable around a pin P1 disposed coaxially with a central axis of the joint portion 12. Here, the joint portion 12 and the joint portion 21 are disposed coaxially in an axial direction of the pin P1 (a Z-axis direction perpendicular to the XY plane). In this manner, the second link 20 is made rotatable around the joint portion 21.

The moving object 2 is disposed not at the joint portions 21, 22 at both ends of the second link 20, but at the bar portion 23. In the present embodiment, the bar portion 23 of the second link 20 is formed in a linear shape, and the moving object 2 is disposed on a line connecting the joint portion 21 at one end of the second link 20 and the joint portion 22 at the other end thereof.

The third link 30 includes a joint portion 31 provided at one end thereof, a joint portion 32 provided at the other end thereof, and a bar portion 33 for integrally combining the joint portions 31, 32 at both ends thereof. The joint portion 31 of the third link 30 is connected to the joint portion 22 of the second link 20 so as to be rotatable around a pin P2 disposed coaxially with a central axis of the joint portion 22. Here, the joint portion 22 and the joint portion 31 are disposed coaxially in the axial direction of the pin P2. In this manner, the third link 30 is made rotatable around the joint portion 31.

The fourth link 40 includes a joint portion 41 provided at one end thereof, a joint portion 42 provided at the other end thereof, and a bar portion 43 for integrally combining the joint portions 41, 42 at both ends thereof. The joint portion 41 of the fourth link 40 is connected to the joint portion 32 of the third link 30 so as to be rotatable around a pin P3 disposed coaxially with a central axis of the joint portion 32. Here, the joint portion 32 and the joint portion 41 are disposed coaxially in the axial direction of the pin P3. In this manner, the fourth link 40 is made rotatable around the joint portion 41.

Further, the joint portion 42 of the fourth link 40 is connected to the joint portion 52 of the fixed link 50 so as to be rotatable around a central axis of the joint portion 52.

To the joint portion 42 of the fourth link 40, an output shaft (not shown) of a rotary drive device M2, for example such as a servo motor is connected, so that a rotational force can be transmitted. Therefore, by operation of the rotary drive device M2, it is possible to rotate the fourth link 40 to a predetermined rotational direction angular position around the joint portion 42.

Lengths of the first link 10, the second link 20, the third link 30, the forth link 40, and the fixed link 50, that is, distances D1 to D5 between the joint portions at both ends of each link, can be appropriately set. Here, it is set that D1=D4, D2>D3, and the moving object 2 is disposed close to the joint portion 22 at the other end of the second link 20 in the bar portion 23 of the second link 20. Thus, it is possible to ensure a movable range of the moving object 2 more evenly on both left and right sides of the base member 60.

Next, an operation of the link structure 1 configured as described above will be described. When the rotary drive devices M1, M2 are operated according to an instruction of, for example, a control unit (not shown), the first link 10 is rotated to a predetermined rotational direction angular position around the joint portion 11 at one end thereof, while the fourth link 40 is rotated to a predetermined rotational direction angular position around the joint portion 42 at the other end thereof, in the XY plane. Thus, a position of the pin P1 which is a connection point with the second link 20 of the first link 10 and a position of the pin P3 which is a connection point with the third link 30 of the fourth link 40 are determined.

Since the second link 20 and the third link 30 are rotatably connected to each other around the pin P2, a position of the pin P2 is also uniquely determined when the positions of the pins P1, P3 are determined as described above. Therefore, positions of all links constituting the link structure 1 are determined, and as a result a position of the moving object 2 disposed in the bar portion 23 of the second link 20 is determined.

Then, when the first link 10 and/or the fourth link 40 are rotated to different rotational direction angular positions by the operation of the rotary drive devices M1, M2, the moving object 2 is also moved in response to this rotation. Thus, the moving object 2 is moved to an arbitrary position in the XY plane, so as to be positioned.

As described above, in the present embodiment, the link structure 1 for freely movably supporting the moving object 2 in a plane, includes the fixed link 50, the first link 10 one end of which is rotatably connected to one end of the fixed link 50, the second link 20 one end of which is rotatably connected to the other end of the first link 10, the third link 30 one end of which is rotatably connected to the other end of the second link 20, and the fourth link 40 one end of which is rotatably connected to the other end of the third link 30 and the other end of which is rotatably connected to the other end of the fixed link 50. Then, the second link 20 includes the joint portions 21, 22 at both ends at which the second link 20 is connected, and the bar portion 23 for integrally combining the joint portions 21, 22 at both ends thereof, and the moving object 2 is disposed in the bar portion 23 of the second link 20.

Therefore, according to the present embodiment, since the moving object 2 is disposed in the bar portion 23 of the second link 20, the moving object 2 is supported across the one end of the second link 20 and the other end thereof. Therefore, it is possible to improve support rigidity, as compared with a case where the moving object 2 is supported by the joint portions 22, 31 in one position where the other end of the second link 20 and one end of the third link 30 are connected to each other.

In this manner, the present embodiment can provide a two-dimensional movement closed-link structure 1 capable of ensuring a wider movable range while improving movement accuracy by improving support rigidity for the moving object 2 by a simple link structure, and capable of being further suitably applied to unprecedented new uses.

<Second Embodiment>

Next, with reference to FIG. 3, a link structure 1*a* according to a second embodiment of the present invention will be described focusing on differences from the link structure 1 according to the first embodiment described above, and the description of the common points will be omitted.

Figure 3:
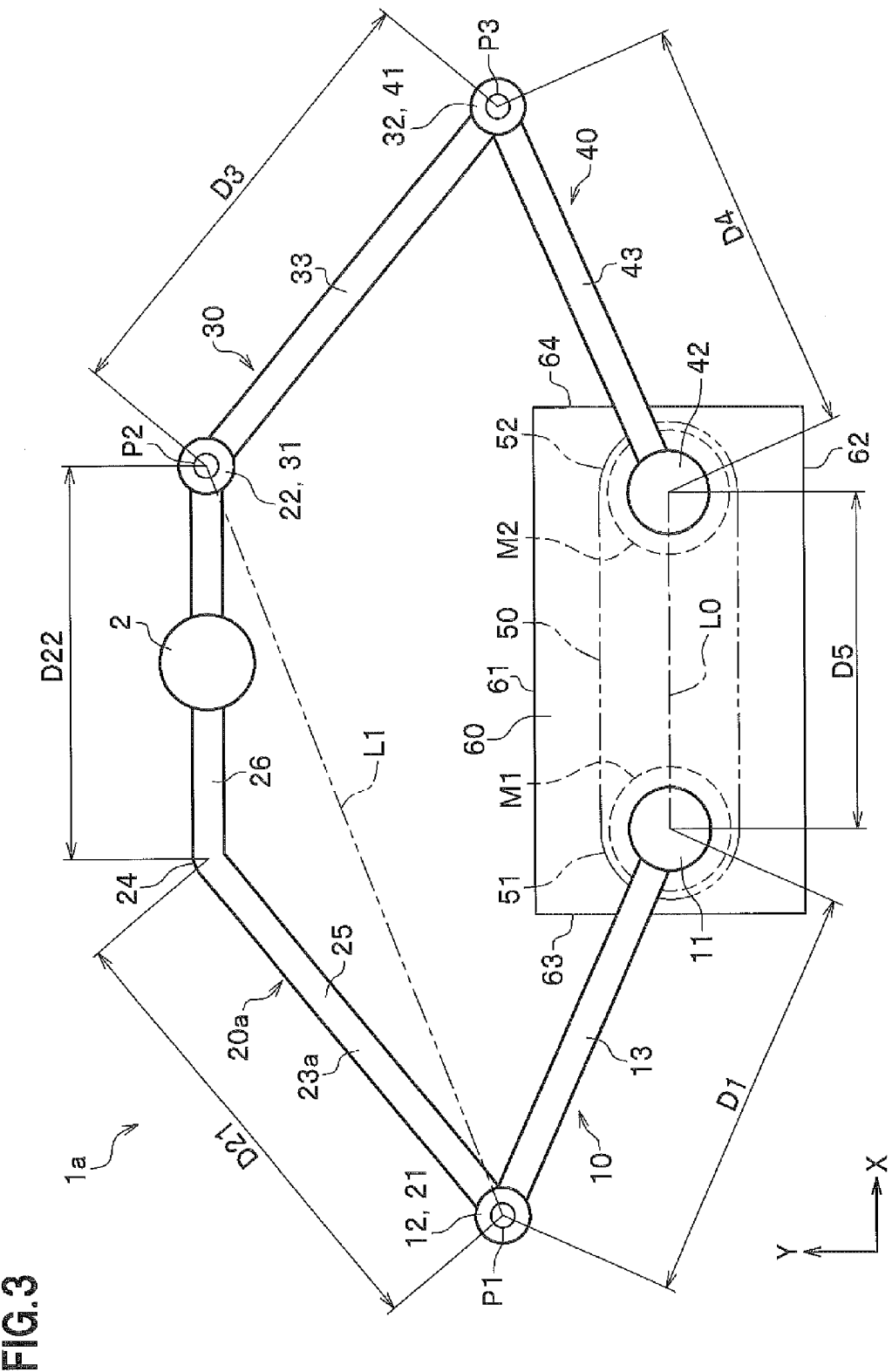
FIG. 3 is a front view schematically showing an overall configuration of a link structure according to a second embodiment of the present invention.

FIG. 3 is a front view schematically showing an overall configuration of the link structure 1*a* according to the second embodiment of the present invention. As shown in FIG. 3, in the second embodiment, the moving object 2 is disposed shifted by a predetermined shift amount toward an outside of a closed link from a line L1 connecting the joint portion 21 provided at one end of the second link 20*a* and the joint portion 22 provided at the other end thereof.

Further, in the second embodiment, a length D1 of the first link 10 and a length D4 of the fourth link 40 are set to be equal to each other, as in the first embodiment, while a bent portion 24 bent in a dogleg shape toward the outside of the closed link is provided in the second link 20*a*. Here, a bar portion 23*a* of the second link 20*a* is composed of a first bar portion 25 defined between the joint portion 21 at one end thereof and the bent portion 24, and a second bar portion 26 defined between the bent portion 24 and the joint portion 22 at the other end thereof. The first bar portion 25 and the second par portion 26 may be formed by bending a bar member which has been formed integrally, or may be formed by fixing together two bar members which have been formed separately, at each end portion thereof to be the bent portion 24.

Then, a length from the bent portion 24 to the joint portion 21 at the one end of the second link 20*a*, namely a length D21 of the first bar portion 25, and the length D3 of the third link 30 are set to be equal to each other.

Further, the moving object 2 is disposed between the bent portion 24 and the joint portion 22 at the other end of the second link 20*a*. That is, the moving object 2 is disposed on the second bar portion 26. Here, the moving object 2 is disposed centrally between the bent portion 24 and the joint portion 22, that is, disposed at a point bisecting a length D22 of the second bar portion 26. In this manner, it is possible to ensure the movable range of the moving object 2 more evenly on both the left and right sides of the base member 60.

In addition to that the same operational effects as the first embodiment described above can be further achieved by the second embodiment configured in this manner, the following operational effects can be further achieved.

That is, in the second embodiment, the moving object 2 is disposed shifted by the predetermined shift amount toward the outside of the closed link from the line L1 connecting the joint portion 21 at the one end of the second link 20*a* and the joint portion 22 at the other end thereof.

Therefore, when the moving object 2 approaches the fixed link 50 side, the moving object 2 is held in a position spaced from the other links 10, 30, 40, 50, by the shift amount of the moving object 2 toward the outside of the closed link. With this configuration, by shifting the moving object 2 toward the outside of the closed link in the second link 20*a*, it is possible to suppress interference between the moving object 2 and the other links 10, 30, 40, 50, thereby ensuring a wider movable range of the moving object 2.

Further, in the second embodiment, it is configured that the length D1 of the first link 10 and the length D4 of the fourth link 40 are equal to each other, the bent portion 24 bent in a dogleg shape toward the outside of the closed link is provided in the second link 20*a*, the length D21 from the bent portion 24 to the one end of the second link 20*a* and the length D3 of the third link 30 are equal to each other, and the moving object 2 is disposed between the bent portion 24 and the other end of the second link 20*a*.

Therefore, when the second bar portion 26, which is a portion between the bent portion 24 and the other end of the second link 20*a*, is parallel to the X-axis, the shape of the closed link forms a line symmetrical shape (see FIG. 3). With this configuration, it is possible to form a compact closed-link structure while ensuring a wider movable range of the moving object 2.

<Third Embodiment>

Next, with reference to FIGS. 4 to 6, a link structure 1*b* according to a third embodiment of the present invention will be described focusing on differences from the link structure 1*a* according to the second embodiment described above, and the description of the common points will be omitted.

Figure 4:
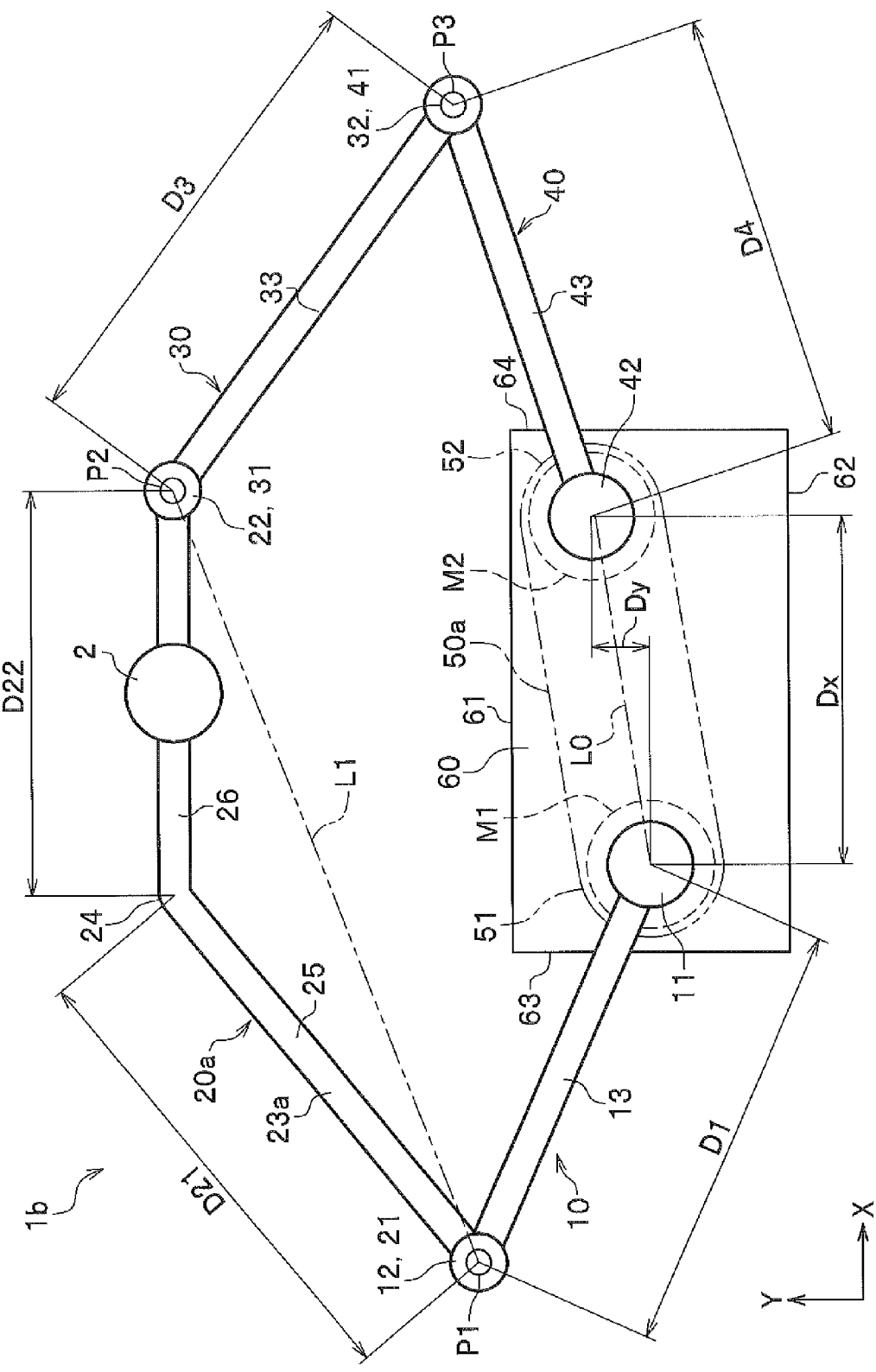
FIG. 4 is a front view schematically showing an overall configuration of a link structure according to a third embodiment of the present invention.
Figure 5:
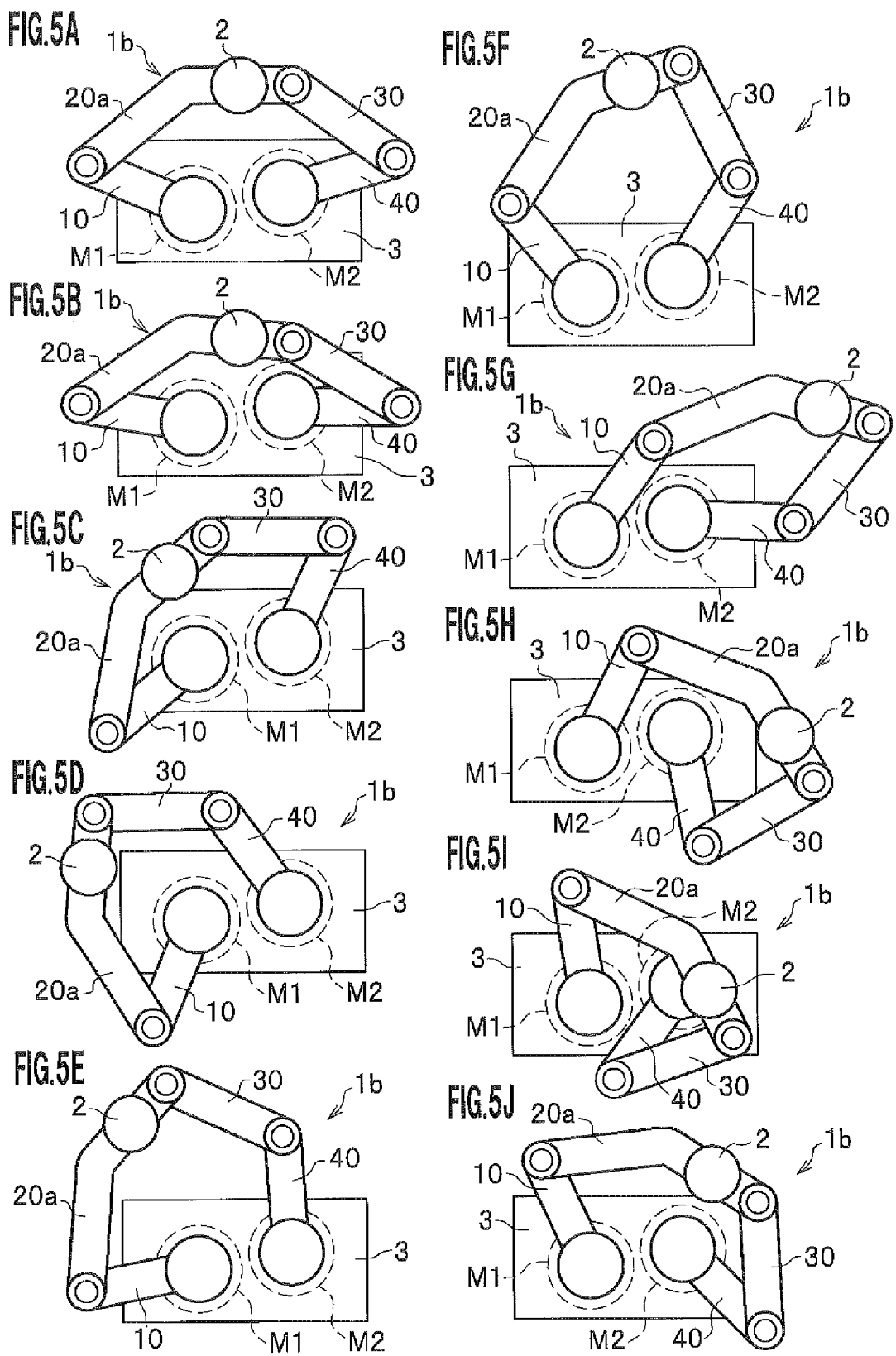
FIGS. 5A to 5J are schematic front views showing states in which a moving object is moved by the link structure according to the third embodiment.

FIG. 4 is a front view schematically showing an overall configuration of the link structure 1*b* according to the third embodiment of the present invention. FIGS. 5A to 5J are schematic front views showing states in which a moving object is moved by the link structure 1*b* according to the third embodiment. FIG. 6 is a schematic front view showing a movable range of the moving object by the link structure 1*b* according to the third embodiment, as well as a movable range of the moving object by the link structure 1*a* according to the second embodiment.

As shown in FIG. 4, in the third embodiment, a crossing angle of the Y-axis and a line L0 connecting one end of a fixed link 50*a* and the other end thereof is set to be closer to a right angle than a crossing angle of the X-axis and the line L0. Then, the joint portion 52 at the other end of the fixed link 50*a* is disposed closer to the moving object 2 in the Y-axis direction than the joint portion 51 at the one end of the fixed link 50*a*.

Here, a distance Dx in the X-axis direction between the joints portions 51, 52 at both ends of the fixed link 50*a* in the third embodiment is set to be equal to the length D5 of the fixed link 50 in the second embodiment. Then, the joint portion 52 at the other end of the fixed link 50a is disposed closer to the moving object 2 in the Y-axis direction, that is, disposed so as to be higher in FIG. 4, than the joint portion 51 at the one end of the fixed link 50a, by a distance Dy in the Y-axis direction between the joint portions 51, 52 at the both ends of the fixed link 50a.

In this third embodiment, when the rotary drive devices M1, M2 are operated, the moving object 2 is moved by the link structure 1b as shown in FIGS. 5A to 5J.

In addition to that the same operational effects as the second embodiment described above can be further achieved by the third embodiment configured in this manner, the following operational effects can be further achieved.

Figure 6:
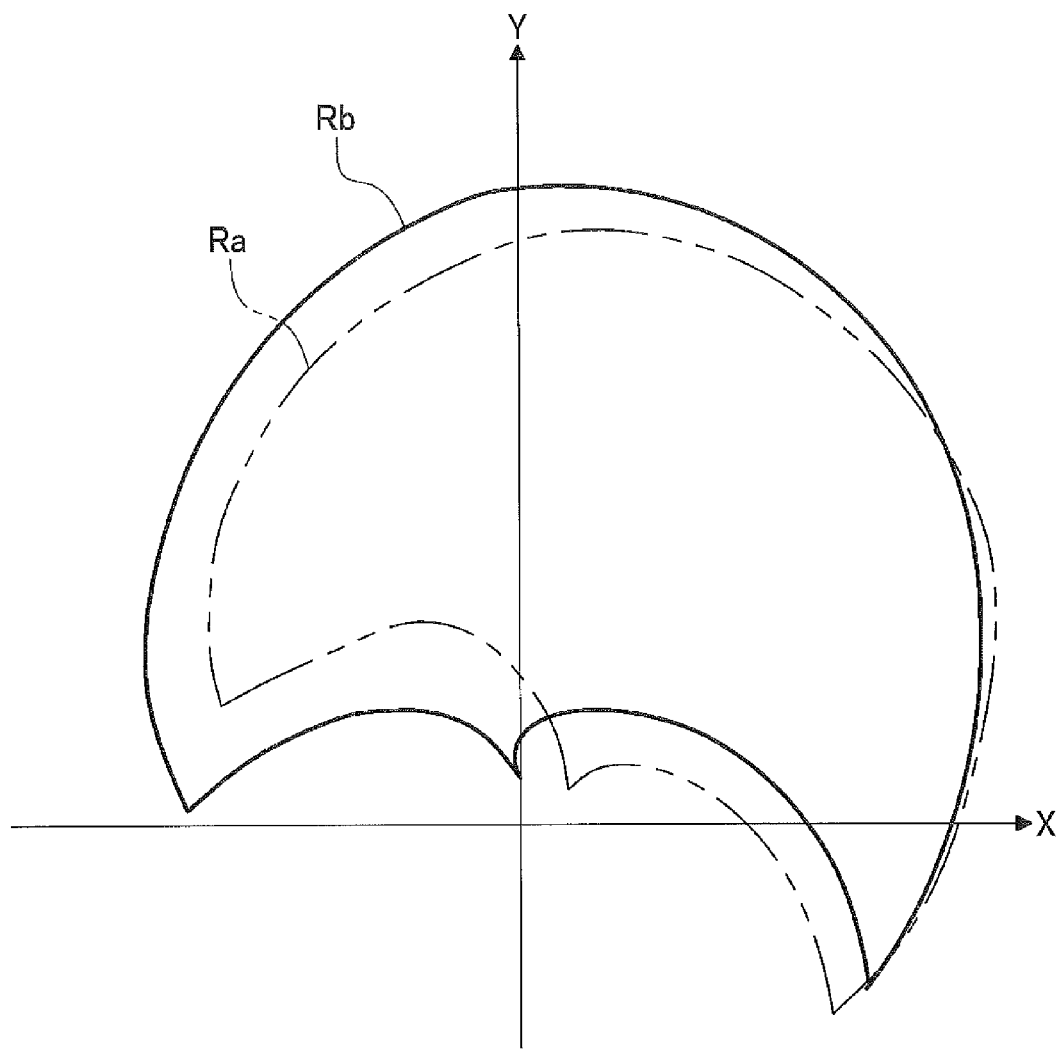
FIG. 6 is a schematic front view showing a movable range of the moving object by the link structure according to the third embodiment, as well as a movable range of the moving object by the link structure according to the second embodiment.

As shown in FIG. 6, when comparing a movable range Ra of the moving object 2 by the link structure 1a according to the second embodiment described above with a movable range Rb of the moving object 2 by the link structure 1b according to the third embodiment, the movable range Ra is shifted to the right side in the XY plane shown in FIG. 6, while the movable range Rb is corrected toward the center. Therefore, according to the third embodiment, it is possible to ensure a wider movable range Rb of the moving object 2 more evenly on both sides of a line which passes through a center of the fixed link 50 and is parallel to the Y-axis, that is, more evenly on both the left and right sides of the base member 60.

<Fourth Embodiment>

Figure 9:
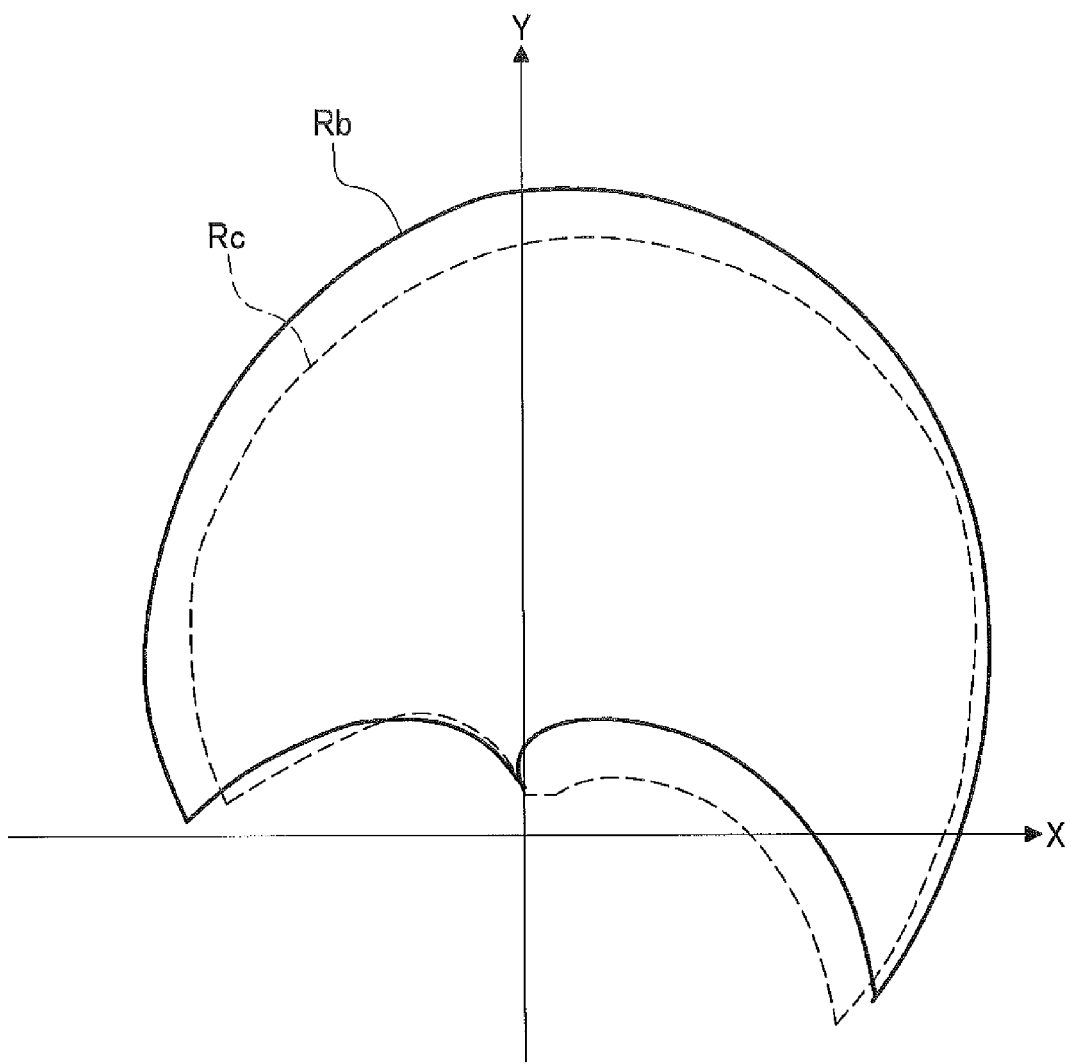
FIG. 9 is a schematic front view showing a movable range of the moving object by the link structure according to the fourth embodiment, as well as the movable range of the moving object by the link structure according to the third embodiment.

Next, with reference to FIGS. 7 to 9, a link structure 1c according to a fourth embodiment of the present invention will be described focusing on differences from the link structure 1b according to the third embodiment described above, and the description of the common points will be omitted.

Figure 7:
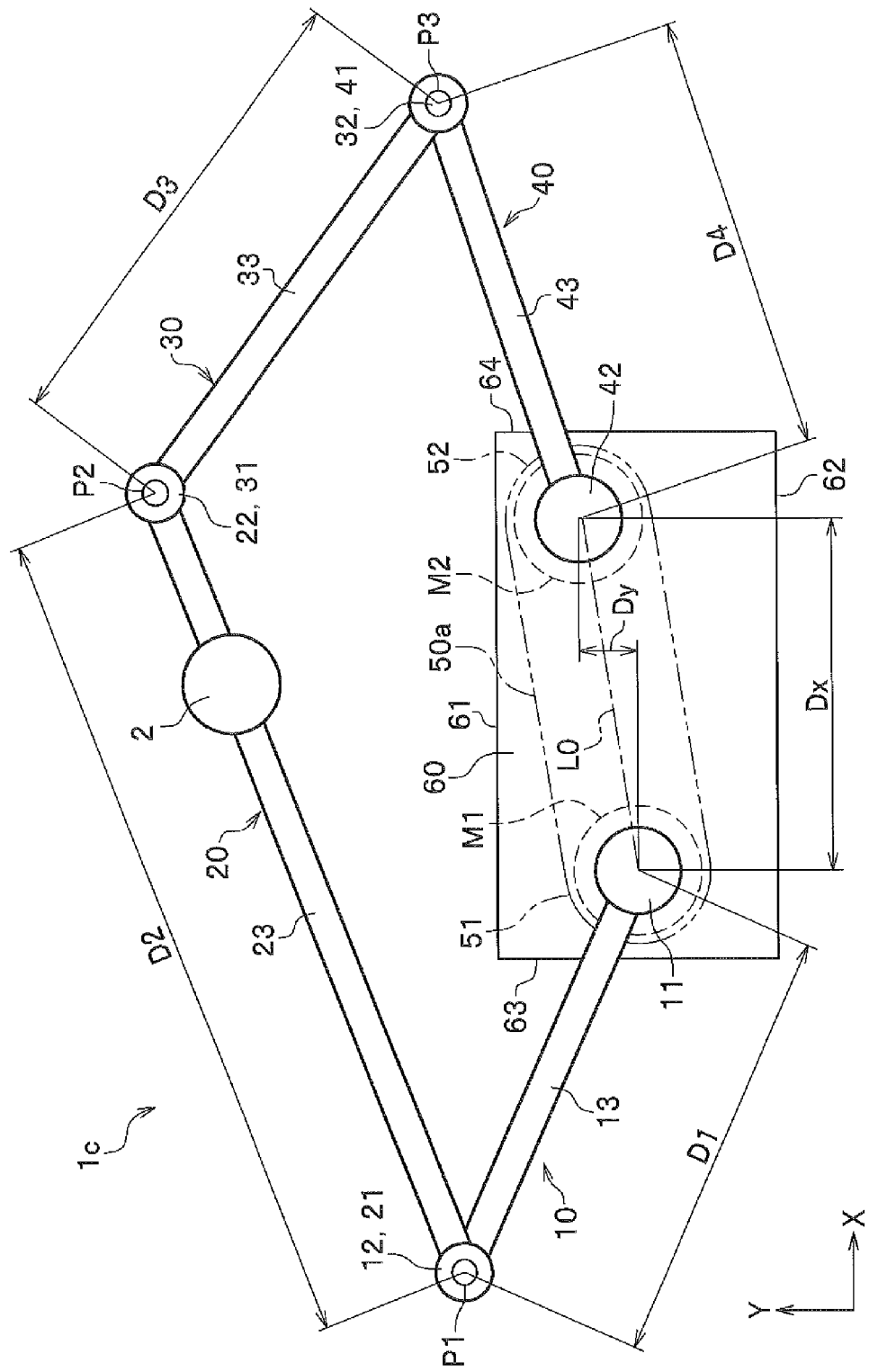
FIG. 7 is a front view schematically showing an overall configuration of a link structure according to a fourth embodiment of the present invention.
Figure 8A:
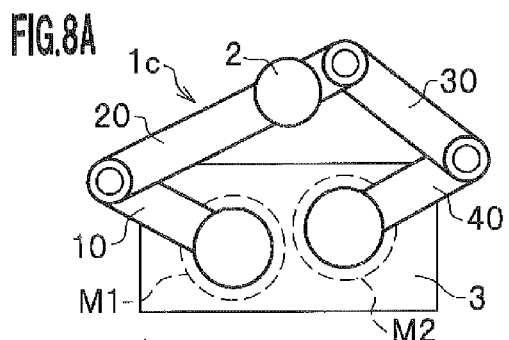
FIGS. 8A to 8J are schematic front views showing states in which the moving object is moved by the link structure according to the fourth embodiment.
Figure 8B:
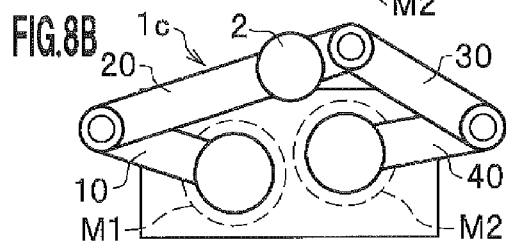
Figure 8C:
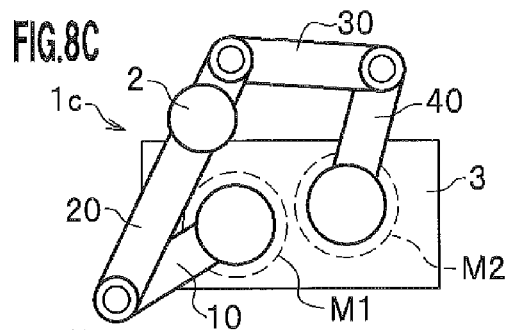
Figure 8D:
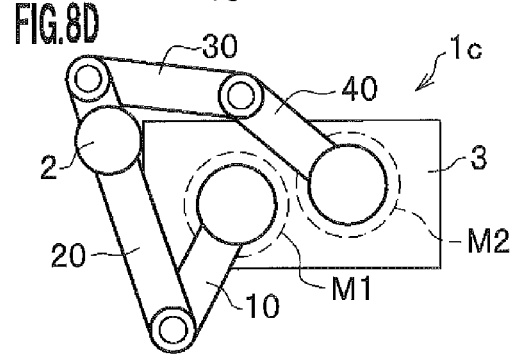
Figure 8E:
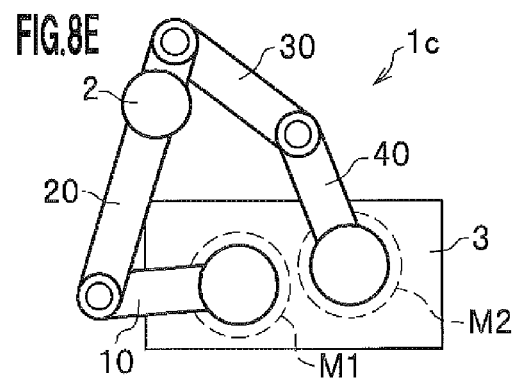
Figure 8F:
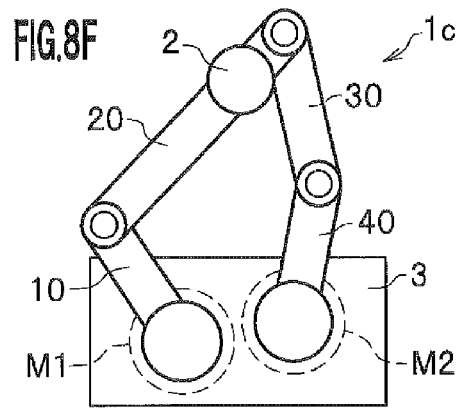
Figure 8G:
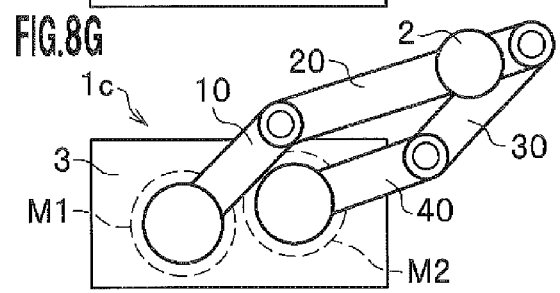
Figure 8H:
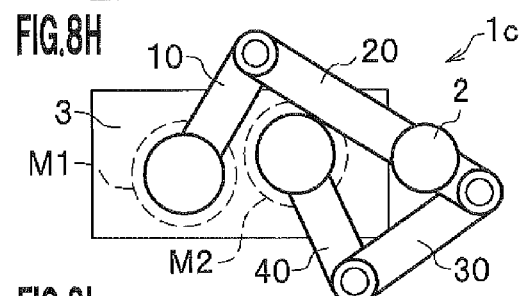
Figure 8I:
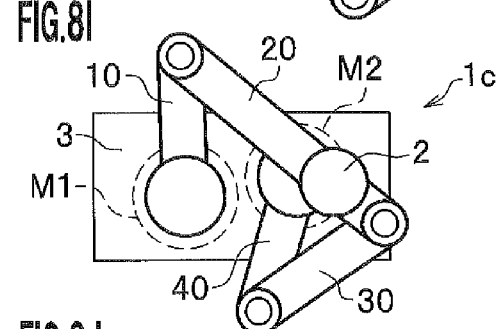
Figure 8J:
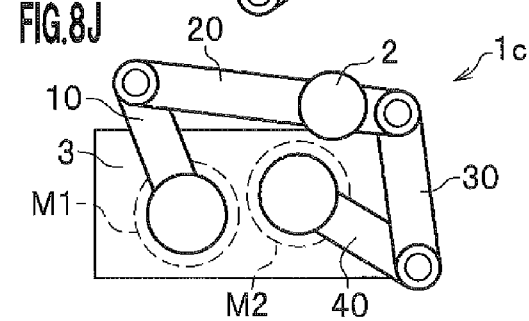

FIG. 7 is a front view schematically showing an overall configuration of the link structure 1c according to the fourth embodiment of the present invention. FIGS. 8A to 8J are schematic front views showing states in which the moving object is moved by the link structure 1c according to the fourth embodiment. FIG. 9 is a schematic front view showing a movable range of the moving object by the link structure 1c according to the fourth embodiment, as well as the movable range of the moving object by the link structure 1b according to the third embodiment.

As shown in FIG. 7, the fourth embodiment is different from the third embodiment in that the bar portion 23 of the second link 20 is formed in a linear shape, and the moving object 2 is disposed on a line connecting the joint portion 21 provided at one end of the second link 20 and the joint portion 22 provided at the other end thereof.

In this fourth embodiment, when the rotary drive devices M1, M2 are operated, the moving object 2 is moved by the link structure 1c as shown in FIGS. 8A to 8J. Then, according to the link structure 1c according to the fourth embodiment, a movable range Rc of the moving object 2 is formed as shown in FIG. 9. Note that, "Rb" in FIG. 9 is intended to show the movable range of the moving object 2 by the link structure 1b according to the third embodiment, for reference.

With the fourth embodiment configured in this manner, it is possible to achieve the same operational effects as the third embodiment described above by using the second link 20 of a simple structure.

As described above, the present invention has been described based on the embodiments, however, the present invention is not limited to the configurations described in each embodiment described above, and it is possible to appropriately change the configuration without departing the scope and spirit of the present invention, including appropriately combining or selecting the configurations described in each embodiment. Further, it is possible to add, delete, or replace a part of the configuration of the embodiments described above.

For example, in the above-mentioned third embodiment and the fourth embodiment, the joint portion 52 at the other end of the fixed link 50a is disposed closer to the moving object 2 than the joint portion 51 at the one end thereof in the Y-axis direction, but the present invention is not limited thereto. For example, the entire link structure 1a according to the second embodiment may be set in a state of being rotated together with the base member 60 by a predetermined angle in a counterclockwise direction in FIG. 3. Also, with this configuration, the movable range of the moving object 2 can be corrected toward the center, so as to be more even on both sides of the line which passes through the center of the fixed link 50 and is parallel to the Y-axis. However, according to the third embodiment and the fourth embodiment, since the base member 60 is not need to be disposed tilted, a dead space on the layout does not occur, and there is an advantage of achieving size reduction and space saving.

REFERENCE SIGNS LIST 1, 1a, 1b, 1c: link structure (two-dimensional movement closed-link structure)
2: moving object
10: first link
11: joint portion at one end
12: joint portion at the other end
13: bar portion
20, 20a: second link
21: joint portion at one end
22: joint portion at the other end
23, 23a: bar portion
24: bent portion
30: third link
31: joint portion at one end
32: joint portion at the other end
33: bar portion
40: fourth link
41: joint portion at one end
42: joint portion at the other end
43: bar portion
50, 50a: fixed link
51: joint portion at one end
52: joint portion at the other end
60: base member
L0: line connecting one end of fixed link and the other end thereof
L1: line connecting one end of second link and the other end thereof
Ra, Rb, Rc: movable range

The invention claimed is:

1. A two-dimensional movement closed-link structure for freely movably supporting a moving object in a plane, comprising:
   a fixed link;
   a first link having one end rotatably connected to one end of the fixed link;
   a second link having one end rotatably connected to another end of the first link;
   a third link having one end rotatably connected to another end of the second link; and a fourth link having one end rotatably connected to another end of the third link and another end rotatably connected to another end of the fixed link, wherein the second link includes joint portions at both ends at which the second link is connected, and a bar portion for integrally combining the joint portions at the both ends, wherein a length of the first link is equal to a length of the fourth link, and wherein the second link is provided with a bent portion bent in a dogleg shape toward an outside of the closed link, a length from the bent portion to the one end of the second link is equal to a length of the third link, and the second link supports the moving object disposed between the bent portion and another end of the second link.

2. The two-dimensional movement closed-link structure according to claim 1, further comprising:

a base member in which the fixed link is disposed, wherein the base member has a shape in which at least two directions out of a left-right direction, a front-rear direction, and an up-down direction are defined, and the two directions of the base member are set in directions respectively along an X-axis and a Y-axis, which define the plane and are perpendicular to each other, while a crossing angle of the Y-axis and a line connecting the one end of the fixed link and another end of the fixed link is set to be closer to a right angle than a crossing angle of the X-axis and the line connecting the one end of the fixed link and another end of the fixed link, and wherein another end of the fixed link is disposed closer to the moving object than the one end of the fixed link in the Y-axis direction.

* * * * *